US009482547B2

(12) United States Patent
McKenzie et al.

(10) Patent No.: US 9,482,547 B2
(45) Date of Patent: Nov. 1, 2016

(54) METHOD AND DEVICE FOR COMPUTER-BASED NAVIGATION

(71) Applicant: BlackBerry Limited, Waterloo (CA)

(72) Inventors: Donald Somerset McCulloch McKenzie, Waterloo (CA); David Ryan Walker, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/014,599

(22) Filed: Aug. 30, 2013

(65) Prior Publication Data

US 2015/0066368 A1    Mar. 5, 2015

(51) Int. Cl.
*G01C 21/00* (2006.01)
*G01C 21/36* (2006.01)

(52) U.S. Cl.
CPC ....... *G01C 21/3626* (2013.01); *G01C 21/3629* (2013.01); *G01C 21/3635* (2013.01); *G01C 21/3676* (2013.01)

(58) Field of Classification Search
CPC .......... G01C 21/3676; G01C 21/3647; G06F 3/048
USPC ................................. 701/532, 533
See application file for complete search history.

(56) References Cited

U.S. PATENT DOCUMENTS

| | | | | |
|---|---|---|---|---|
| 2007/0150188 A1* | 6/2007 | Rosenberg | ......... | G01C 21/3647 701/431 |
| 2008/0312821 A1 | 12/2008 | Muhlfelder et al. | | |
| 2009/0289937 A1* | 11/2009 | Flake | ...................... | G06T 17/05 345/419 |
| 2010/0094533 A1 | 4/2010 | Wu et al. | | |
| 2010/0161207 A1* | 6/2010 | Do | ............................ | H04W 4/02 701/532 |
| 2010/0169010 A1* | 7/2010 | Jeong | .................. | G01C 21/3647 701/533 |
| 2011/0112750 A1* | 5/2011 | Lukassen | ........... | G01C 21/3676 701/532 |
| 2014/0129976 A1* | 5/2014 | Beaurepaire | ......... | G01C 21/367 715/788 |
| 2015/0066368 A1* | 3/2015 | McKenzie | .......... | G01C 21/3635 701/538 |

FOREIGN PATENT DOCUMENTS

EP   2280244   2/2011
JP   2002257576   9/2002

OTHER PUBLICATIONS

European Patent Office, Extended European Search Report, Patent No. 2843368, Apr. 1 2015.

* cited by examiner

*Primary Examiner* — Redhwan K Mawari
(74) *Attorney, Agent, or Firm* — Moffat & Co.

(57) ABSTRACT

A video route-previewing system includes a route-previewing device for receiving input defining a starting point and a destination point and for identifying a route based on the starting point and the destination point. A preview-generating device receives the route from the route-previewing device and generates an image request for the route. A street-level imagery server receives the image request from the preview-generating device and communicates imagery of the route to the preview-generating device in response to the image request. The preview-generating device generates a time-compressed nonlinear route preview from the imagery of the route and communicates the preview to the route-previewing device. The route-previewing device displays the preview video of the route. The preview video may time-compress segments without navigational decision points and present in slow-motion segments around navigational decision points.

19 Claims, 13 Drawing Sheets

METHOD AND DEVICE FOR COMPUTER-BASED NAVIGATION

CROSS-REFERENCE TO RELATED APPLICATIONS

This is the first application filed for the present technology.

TECHNICAL FIELD

The present technology relates generally to a method and device for computer-based navigation and, in particular, to imagery-based navigation systems.

BACKGROUND

With the advent of online street imagery databases, it is now common practice for computer users to consult or preview street-level imagery as a navigation aid, i.e. to prepare for a trip in lieu of, or in addition to, consulting a two-dimensional road map. To do so, the user accesses the street-level imagery at the starting point of a projected route and then views successive imagery by moving forward through the street-level images one click at a time toward the destination. This provides the user with a preview of what the user will expect to see when navigating the route. This technique, however, is extremely tedious as it requires the user to click stepwise through the route. In some instances, there may be long stretches of road that contain no navigational decision points. The user has to advance through these sections to the navigational decision points, making the process time-consuming and inefficient. A solution to this technical problem is therefore highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
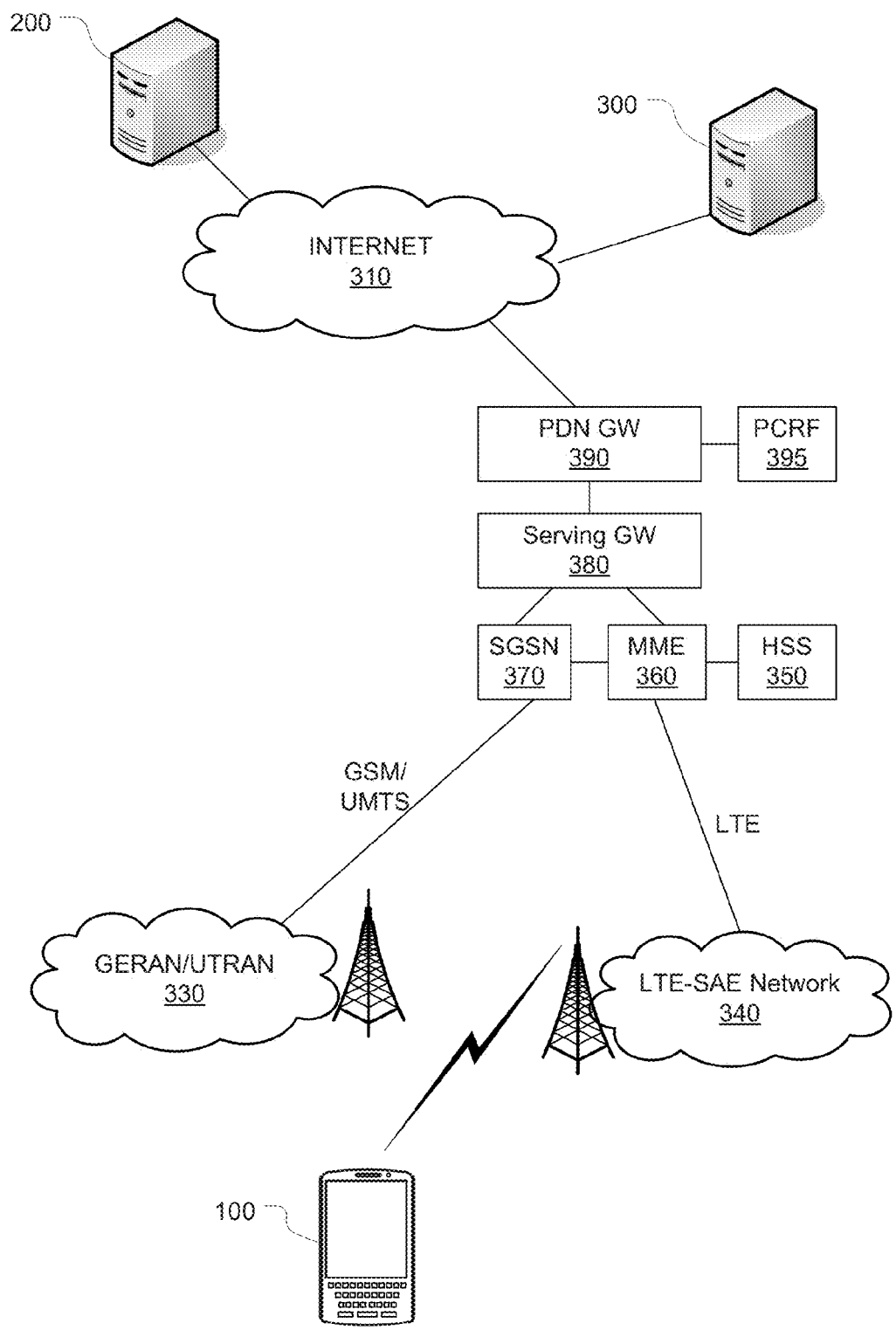
FIG. 1 depicts a system for generating a time-compressed nonlinear video preview of a route.

The present technology provides a time-compressed nonlinear video preview of a route. This time-compressed nonlinear video preview provides detailed video content of navigational decision points while providing only minimum video content for the zones where there are no navigational decision points. The video preview may be viewed as a prelude to navigating the route permitting the user to familiarize himself with the route. The video preview emphasizes the key navigational decision points along the route. The video preview may be generated by a preview-generating server or other such computing device from street-level imagery accessed from a street-level imagery database in response to a request from a mobile device or other computing device running a route-preview application. The request includes a starting point and a destination point to define the route.

Accordingly, an inventive aspect of the present technology is a computer-implemented method for providing navigation information. The method entails identifying a route, identifying navigational decision points along the route, and generating a time-compressed nonlinear video preview of the route wherein the video preview of the route comprises more video imagery of portions of the route containing navigational decision points than portions of the route without navigational decision points.

Another inventive aspect of the present technology is a computer-readable medium comprising instructions in code which when loaded into a memory and executed by a processor of a computing device cause the computing device to identify a route, identify navigational decision points along the route and generate a time-compressed nonlinear video preview of the route wherein the video preview of the route comprises more video imagery of portions of the route containing navigational decision points than portions of the route without navigational decision points.

Another inventive aspect of the present technology is a computing device that includes a user input device for receiving a starting point and a destination that defines a route, a data transceiver for transmitting the route to a preview-generating server that generates a video preview of the route and a processor operatively coupled to the memory for cooperating with the data transceiver to receive the video preview of the route, the processor being further configured to cooperate with a display to play the video preview of the route.

Yet a further inventive aspect of the present technology is a system that includes a route-previewing device for receiving input defining a starting point and a destination point and for identifying a route based on the starting point and the destination point, a preview-generating device for receiving the route from the route-previewing device and for generating an image request for the route and a street-level imagery server for receiving the image request from the preview-generating device and for communicating imagery of the route to the preview-generating device in response to the image request. The preview-generating device generates a time-compressed nonlinear route preview from the imagery of the route and communicates the preview to the route-previewing device to enable the route-previewing device to display the preview.

The details and particulars of these aspects of the technology will now be described below, by way of example, with reference to the drawings.

FIG. 1 is a schematic depiction of a computerized system for providing a video preview of a route to enhance a navigational experience of a user.

The system 10 shown by way of example in FIG. 1 includes a route-previewing device 100 (e.g. a mobile device or other computing device) for receiving input defining a starting point and a destination point and for identifying a route based on the starting point and the destination point. The illustrated system 10 further includes a preview-generating device 200 (e.g. a server) for receiving the route from the route-previewing device and for generating an image request for the route. The illustrated system 10 further includes a street-level imagery server 300 for receiving the image request from the preview-generating device and for communicating imagery of the route to the preview-generating device in response to the image request. The preview-generating device 200 generates a time-compressed nonlinear route preview from the imagery of the route and communicates the preview to the route-previewing device 100 to enable the route-previewing device 100 to display the preview. In one embodiment, the preview-generating device 200 and the imagery server 300 may be consolidated in a single server. In another embodiment, the route-previewing device may generate its own preview by obtaining the imagery from the imagery server. In yet another embodiment, a single computing device may store street-level imagery locally in its own memory and may generate its own preview based on this locally stored street-level imagery.

As further illustrated by way of example in FIG. 1, the route-previewing device 100 may be a mobile device (or wireless communications device). The mobile device 100 may communicate via the Internet 310 with preview-generating server 200 and the imagery server 300. The mobile device may transmit and receive data packets via wireless/mobile network infrastructure. As shown by way of example, the mobile device 100 may employ GSM/UMTS/LTE technologies to receive data packets comprising the preview video from the preview-generating server 200. The data packets sent and received by the mobile device 100 are communicated through a wireless data network represented schematically in FIG. 1 by the GERAN/UTRAN network 330 and the LTE-SAE network 340. A 4G device will communicate via the LTE (Long-Term Evolution-System Architecture Evolution) network whereas a 3G device will access the IP network via GERAN (GSM EDGE Radio Access Network) or UTRAN (Universal Terrestrial Radio Access Network for a UMTS radio access network). LTE data packets are handled by mobile management entity (MME) 360 whereas GSM/UMTS data packets are handled by serving GPRS support node (SGSN) 370. A Home Subscriber Server (HSS) 350, serving gateway 380 and packet data network gateway 390. A Policy Charging and Rules Function (PCRF) 395 provides Quality-of-Service (QoS) information to the packet data network gateway, dynamically manages data sessions, and also determines a charging policy for packets.

Figure 2:
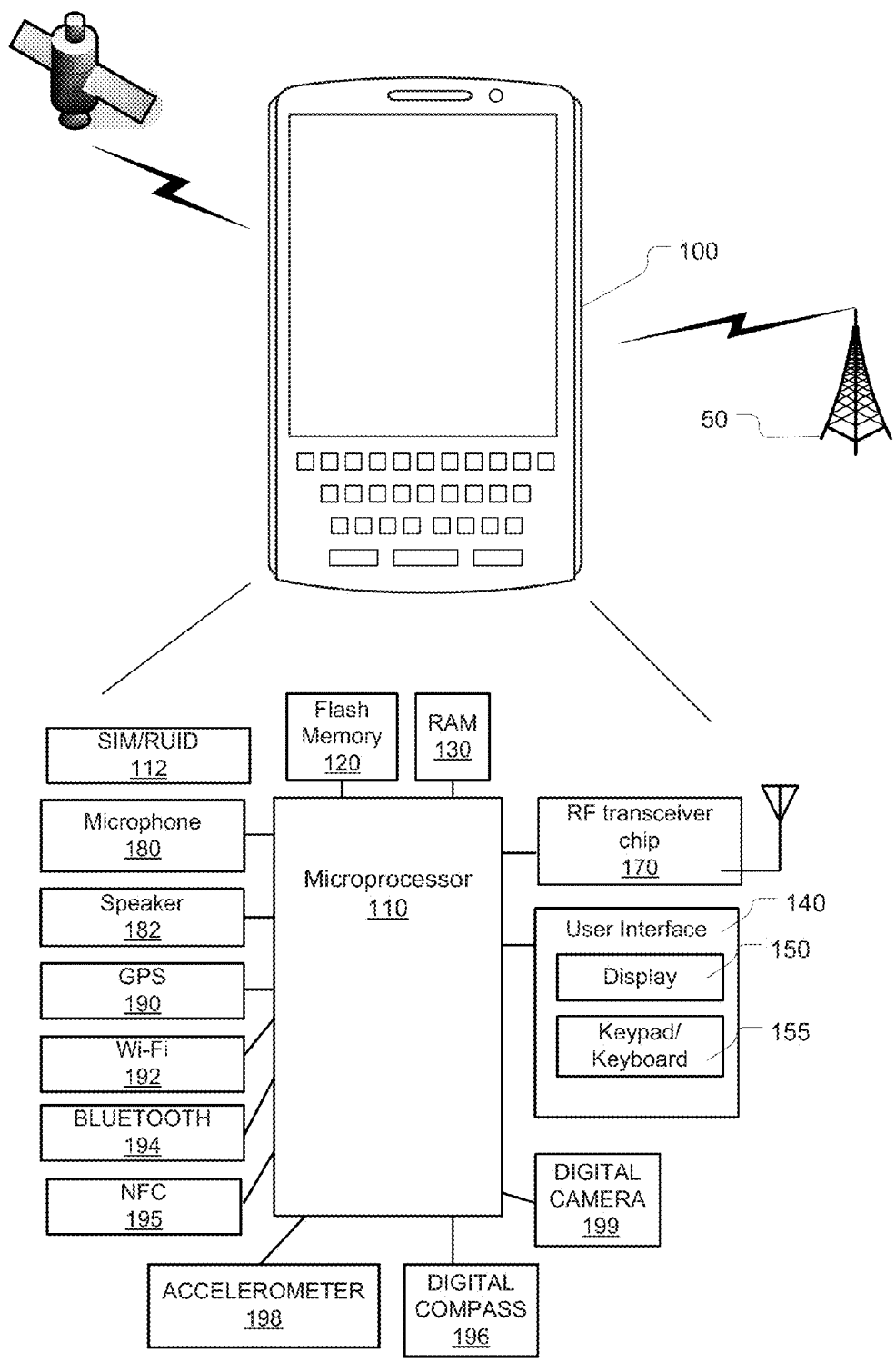
FIG. 2 depicts a mobile device as one example of a route-previewing device.

FIG. 2 is a depiction of a mobile device (or wireless communications device) as one example of a route-previewing device 100 that may be used to preview the time-compressed nonlinear video of the route. Although a mobile device is illustrated as an exemplary route-previewing device, it will be understood that the route-previewing device may be a desktop computer, laptop computer, notebook, tablet, or any other computing device. For the purposes of this specification, a mobile devices (or wireless communications device) includes cell phones, smart phones, mobile phones, portable digital assistants, or any other such portable, mobile or handheld electronic communications devices. From the foregoing, it will be appreciated that the route-previewing device may be a wired device or a wireless device.

As illustrated by way of example in FIG. 2, a mobile device acting as the route-previewing device 100 has a processor 110 and a memory 120, 130. The memory of the mobile device 100 may include flash memory 120 and/or random access memory (RAM) 130 although other types or forms of memory may be used. The device may also include expandable memory in the form of a removable microSD memory card.

The mobile device 100 may include a position-determining subsystem 190 (e.g. a GNSS receiver such as a GPS receiver) for determining a current location of the mobile device.

As depicted by way of example in FIG. 2, the mobile device 100 includes a user interface 140 for interacting with the mobile device and its applications. The user interface 140 may include one or more input/output devices, such as a display screen 150 (e.g. an LCD or LED screen or touch-sensitive display screen e.g. an Active-Matrix Organic Light-Emitting Diode touchscreen display or equivalent), and a keyboard or keypad 155. A pure touch-screen device may provide a virtual keyboard onscreen and thus need not have a physical keyboard. The user interface may also optionally include any other input devices such as an optical jog pad, thumbwheel, trackball, track pad, etc.

As depicted by way of example in FIG. 2, the mobile device 100 may include a wireless transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc. Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may optionally include one or more ports or sockets for wired connections, e.g. USB, HDMI, FireWire (IEEE 1394), etc. or for receiving non-volatile memory cards, e.g. SD (Secure Digital) card, miniSD card or microSD card.

For voice calls, the mobile device 100 includes a microphone 180, a speaker 182 and/or an earphone jack. Optionally, the device may include a speech-recognition subsystem for transforming voice input in the form of sound waves into an electrical signal. The electrical signal is then processed by a speech-recognition module (digital signal processor) to determine voice commands from the voice input.

The position-determining subsystem 190 may be a Global Positioning System (GPS) receiver (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any global navigation satellite system (GNSS), i.e. any other satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system.

Optionally, the mobile device 100 may include a Wi-Fi™ transceiver 192 (e.g. IEEE 802.11a/b/g/n), a Bluetooth® transceiver 194, and/or a near-field communications (NFC) chip 195. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 (magnetometer) and/or a tilt sensor or accelerometer 198. The device may optionally include other sensors such as a proximity sensor, ambient light sensor, and gyroscope. Optionally, the mobile device may include a digital camera 199.

Figure 3:
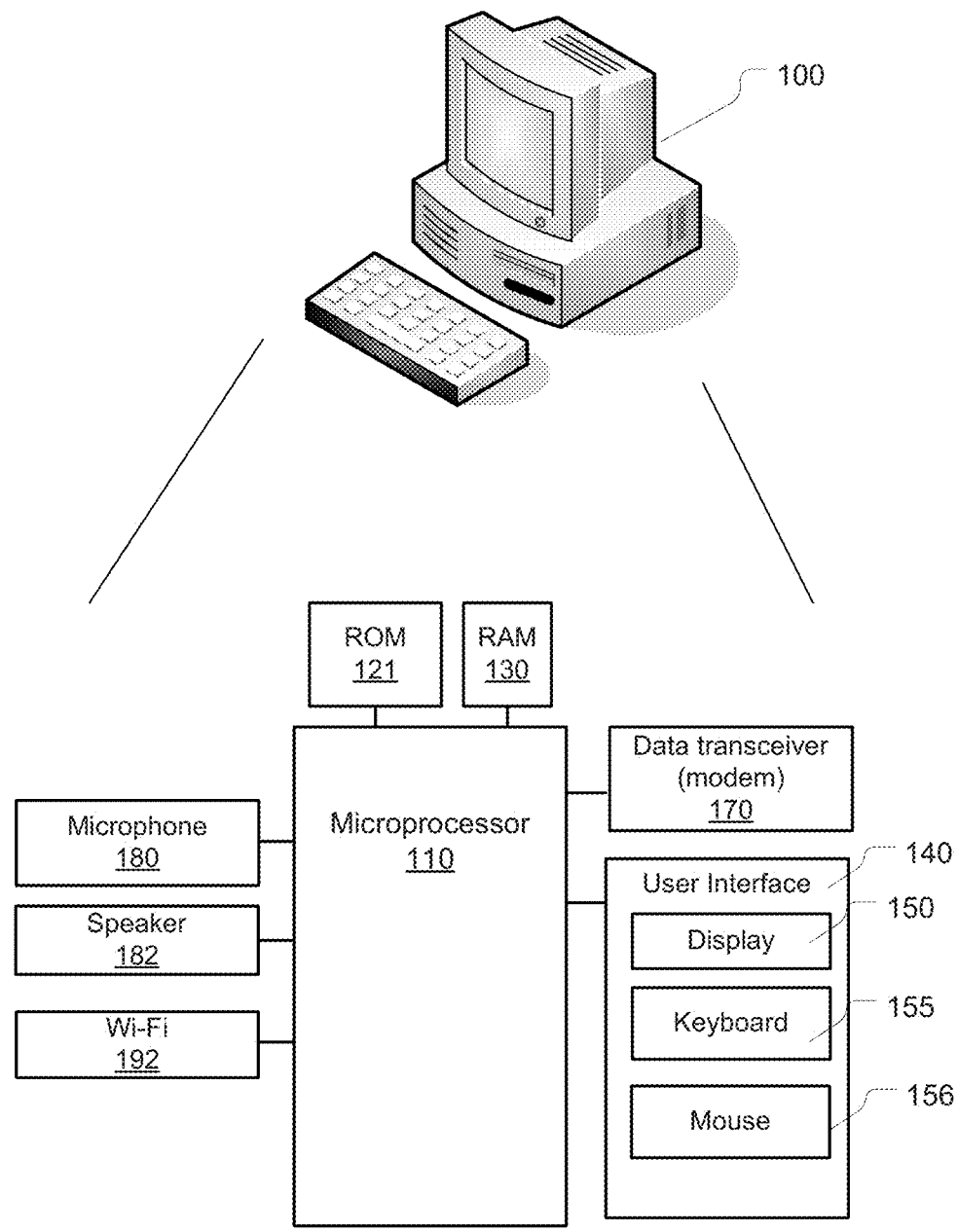
FIG. 3 depicts a desktop computer as another example of a route-previewing device.

FIG. 3 shows a schematic depiction of a desktop computer as another example of a route-previewing device 100. The computing device (e.g. desktop computer) includes a processor 110 and memory (including ROM 121 and RAM 130). The computing device 100 includes a data transceiver 170 (e.g. a modem such as a DSL modem or a coax cable modem) and a user interface 140 that includes a display 150, a keyboard 155 and a mouse 156. The computer may optionally include other components such as a microphone 180, speaker 182 and Wi-Fi transceiver 192. The computer may be connected to the Internet 310 via the data transceiver (modem) 170 to communicate with the preview-generating device 200 or, in other embodiments, with the street-level imagery server 300.

Figure 4:
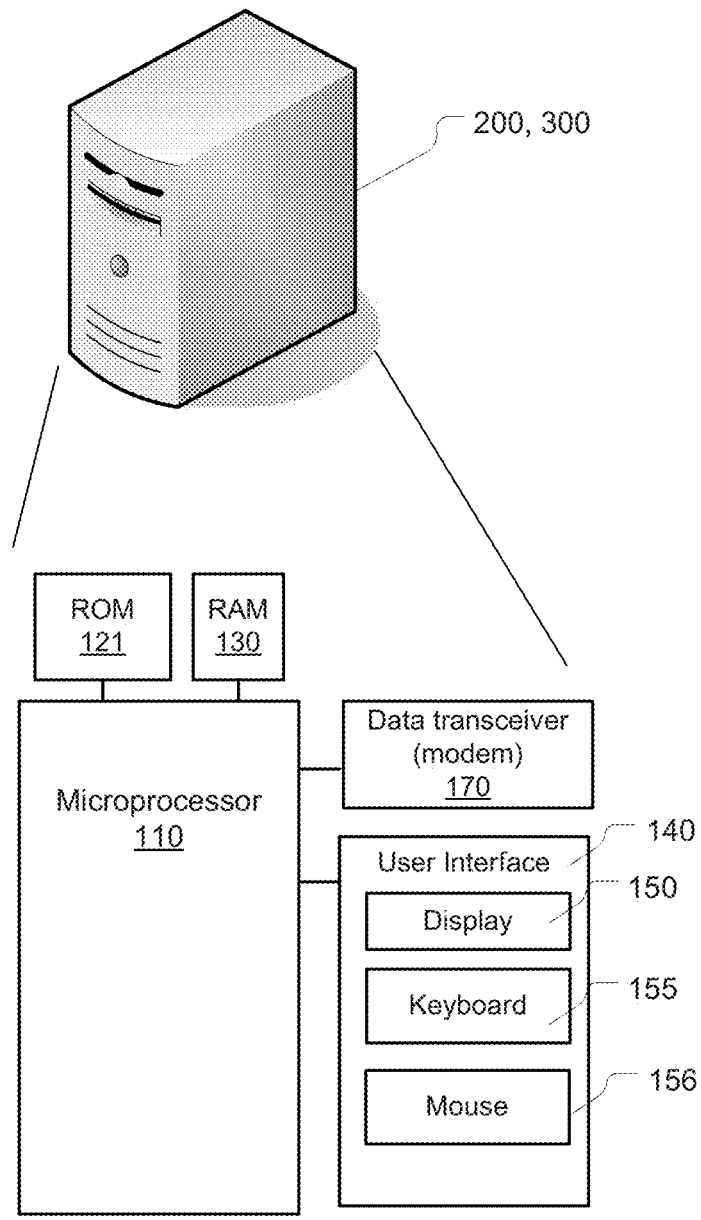
FIG. 4 depicts a server that may function as a preview-generating device and/or an imagery server.

FIG. 4 shows a schematic depiction of certain components of a server which may be a preview-generating server 200 or an imagery server 300 (or a consolidated previewing-generating and imagery server). This server 200, 300 includes a microprocessor 110, memory (ROM 121, RAM 130), a data transceiver (modem) 170. The server may also include a user interface 140 that includes a display 150, keyboard 155 and mouse 156. In other embodiments, the preview may be generated on the device or in cloud computing environment. In a further embodiment, the preview may be partially generated by the server 200 and partially generated by the device.

The route-previewing device 100 receives user input via a keyboard, mouse, touch-screen, etc. specifying a route. This user input may be a starting point and a destination point. The starting point and destination point may be specified using coordinates of latitude and longitude, a street address, city name, postal code, or by selecting a point, POI or object on a map.

Figure 5:
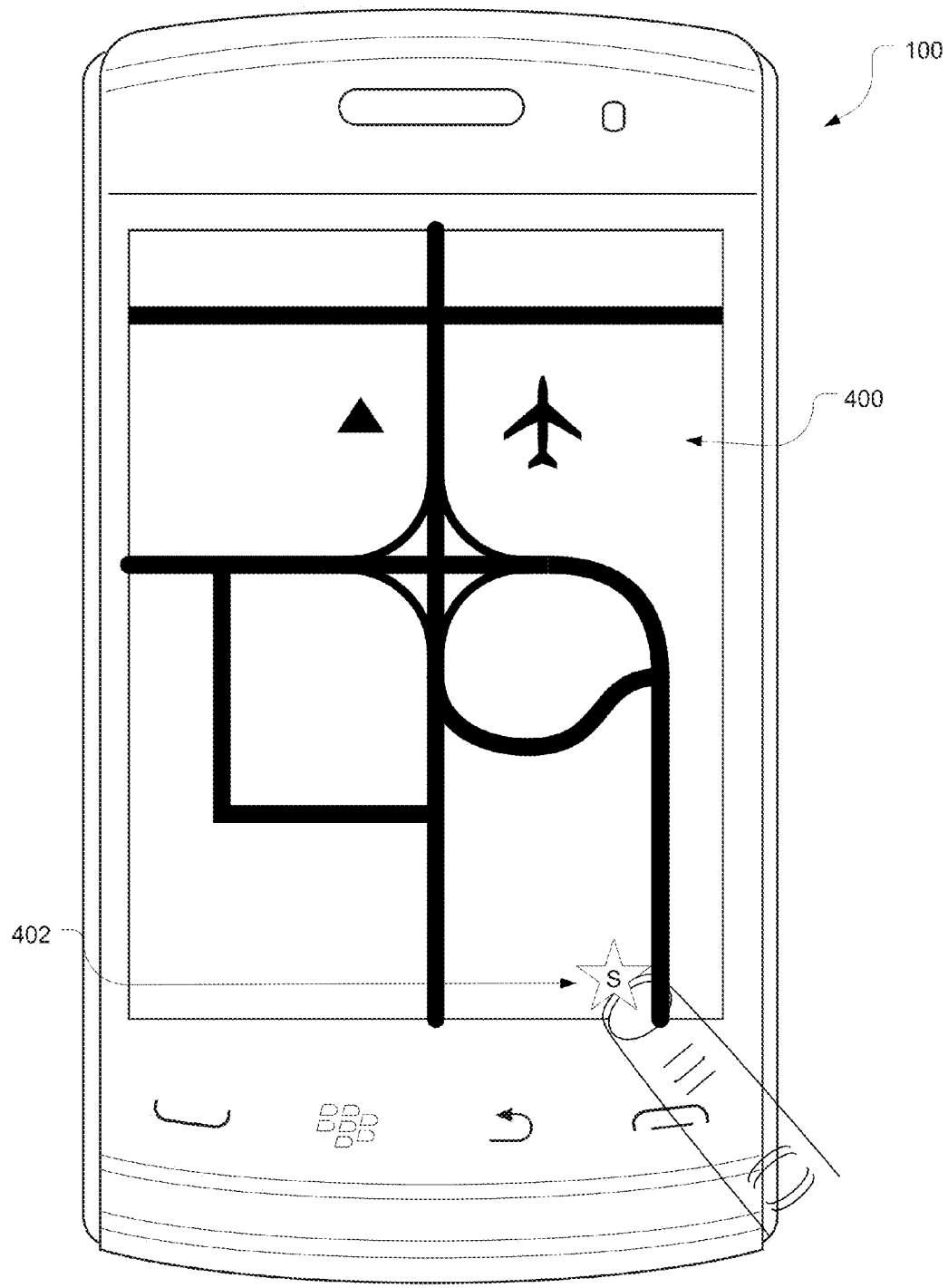
FIG. 5 depicts the selection of a starting point of a route on a map displayed on a mobile device.

FIG. 5 shows an example in which a user touches a first point on a map 400 displayed on a touch-sensitive screen of a mobile device. Touching the first point on the map on the touch-screen display causes a starting point 402 to be defined. In another embodiment, the starting point may be a current location of the device 100 as determined using the position-determining subsystem 190.

Figure 6:
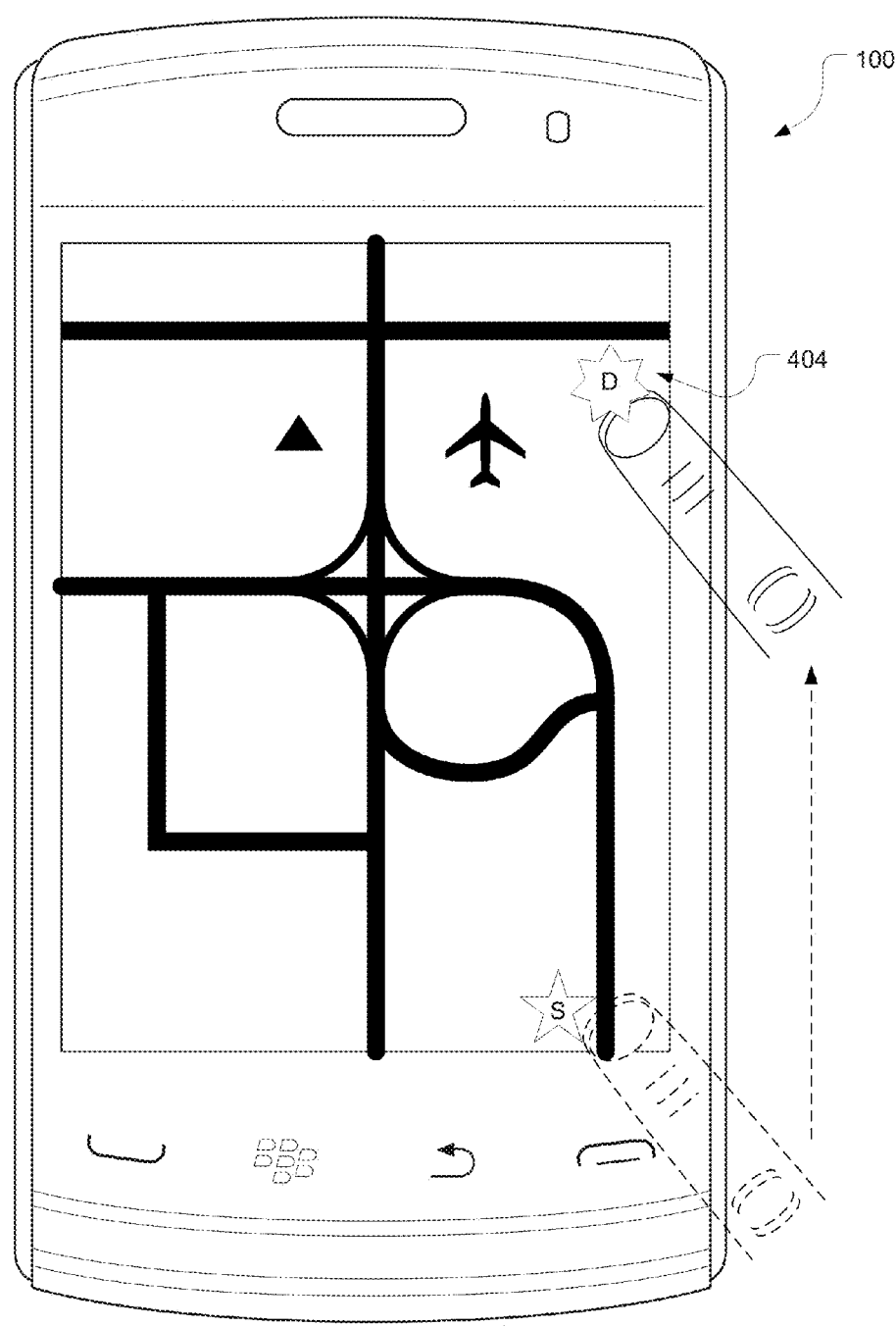
FIG. 6 depicts the selection of a destination point on the map of FIG. 5.
Figure 7:
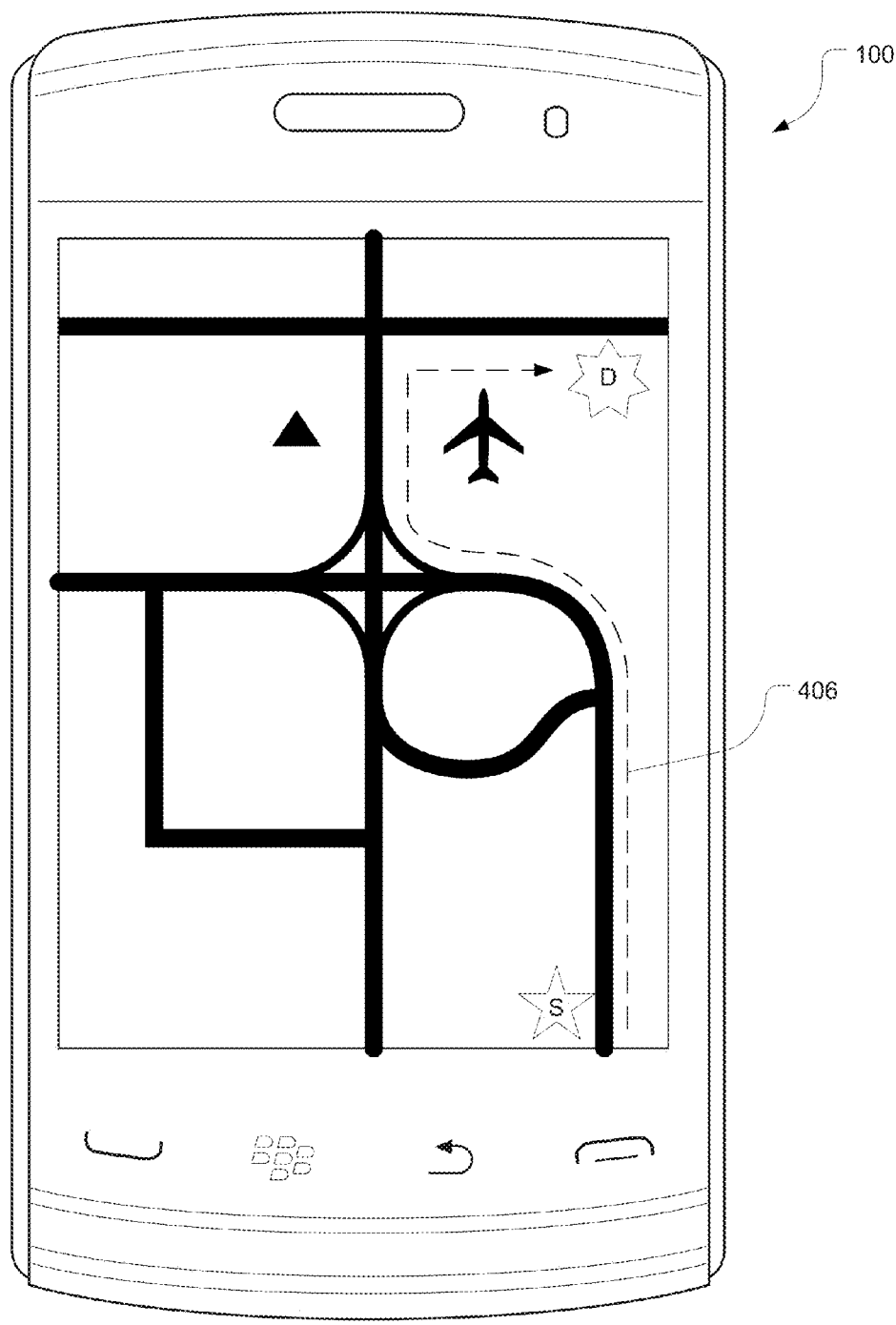
FIG. 7 depicts a route plotted on a map between the starting and destination points of FIG. 6.

Subsequently, as shown by way of example in FIG. 6, the user may touch a second point on the map to define a destination. Based on the starting point and destination, the device 100 identifies the route. There may be multiple possible routes between the starting point and destination point 404. The starting point 402 and destination point 404 define the route. This may be performed within a navigation application or a mapping application that provides route directions.

Where there are multiple potential routes, the device 100 may select the shortest or fastest route, or the route with the least traffic, or it may request user input to select the route. Determining the route may be done locally or by sending the starting and destination points to a mapping server to obtain the route. FIG. 7 depicts a route 406 displayed on the map as determined by the mobile device 100 or by a server in communication with the mobile device. Instead of the dashed line as shown in FIG. 7, the route 406 may be highlighted with a different colour or marked using any other suitable graphical technique such as superimposing a partially transparent line over the route. The server may be a map server, routing server or it may be the preview-generating server 200.

The route-previewing device 100 communicates the route (or alternatively the starting point and destination point) to the preview-generating device (server) 200. The preview-generating server 200 identifies navigational decision points along the route. For example, the navigation decision points (NDP#1, NDP#2, NDP#3) are identified in FIG. 8. Alternatively, this may be done by the route-previewing device 100 prior to sending the route to the server 200. The navigational decision points may include intersections, forks in the road, on-ramps and off-ramps, turns, or any other critical point along the route where the navigation provides instructions to the user to turn, change lanes, enter an on-ramp or exit an off-ramp. Alternatively, the navigational decision points may be points where statistical traffic data indicates that there are frequent accidents or navigational errors. In one embodiment, all navigational decision points are used (included) when generating the video. In another embodiment, only a subset of all navigational decision points are included in the video. The server 200 may filter out navigational decision points based on user-specified parameters sent from the route-previewing device 100. For example, the parameters may specify that only turns onto different streets are to be treated as navigational decision points, and not for example on-ramps or off-ramps. In yet another embodiment, the navigational decision points may be graded or ranked in terms of their navigational complexity (likelihood of making a navigational error). In one example implementation, the highly complex points may be presented in very slow motion, the medium complexity points in slow motion, and the low complexity points at normal (real-world) or accelerated speed.

Once the navigational decision points have been identified, the process of generating the video preview may commence. To generate the video preview, street-level imagery of the route must be obtained from the street-level imagery server 300. The device 200 may request all available street-level images for the complete route although a more efficient approach would be for the device 200 to request only a subset of the available street-level images. The device 200 may, for example, request all available imagery for a navigational decision point but only a few sample or representative images along a segment of the route that contains no decision points. This latter technique reduces the amount of data that has to be transferred.

Figure 8:
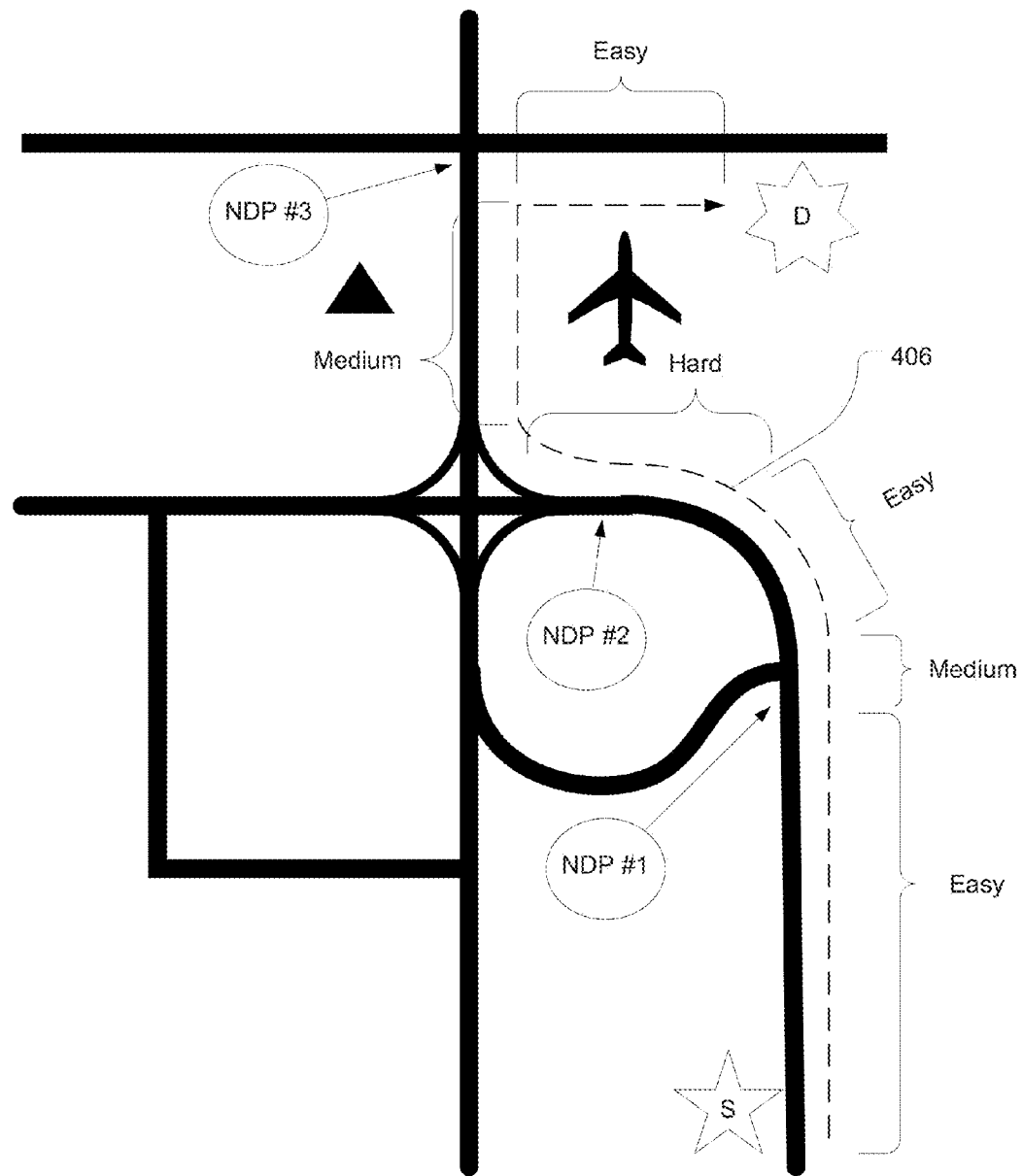
FIG. 8 depicts segments of the route having three navigational decision points and wherein the segments of the route are categorized in terms of navigational difficulty as easy, medium and hard.

In one implementation, generating the video comprises defining segments of the route, assigning a navigational complexity score to each segment of the route, and time-compressing the segments based on the score for each segment of the route. FIG. 8 shows how the route is divided up into segments that are categorized in terms of their navigational difficulty as easy, medium or hard. Any other categorization or ranking system may be employed to rate the segments in terms of their navigational complexity. As another example, each segment may be given a score of 1 to 5 with 1 being navigationally simple and 5 being navigationally complex. The degree of time-compression would be based on the scoring, e.g. a segment scored as 2 would thus be compressed more than a segment scored as 4. This scoring method is simply one way of ranking segments of a route to provide variable time-compression of each different segment of the route. The scoring method may include more or less scores and may be ranked in reverse order to the example given above.

The preview-generating device 200 upon receipt of the images from the image server 300 generates a time-compressed nonlinear video preview of the route. The preview is time-compressed in the sense that the time to view the route preview video is shorter in time than the actual time required to drive the route. For example, if it takes 1 minute to drive a 1 km segment at a speed of 60 km/h, the real-world viewing time would be 1 minute but the preview may last only 30 seconds in which case the time compression would be 2:1. If the preview lasts only 10 seconds, the time compression would be 6:1. The time compression may be user-varied in response to user input. The route preview is nonlinear in the sense that navigationally challenging portions of the route are emphasized by showing them, for example, in slow-motion whereas navigationally simple portions of the route are skimmed over (i.e. presented quickly by a few representative images). The degree of nonlinearity may also be user-varied in response to user input. In other words, the device may extend or curtail the amount of video imagery presented at a navigational decision point in response to user input.

The selected images for the route are spliced together to form a video. The video may be in any suitable format such as, but not limited to, AVI, MOV, WMV, MPEG-4.

Figure 9:
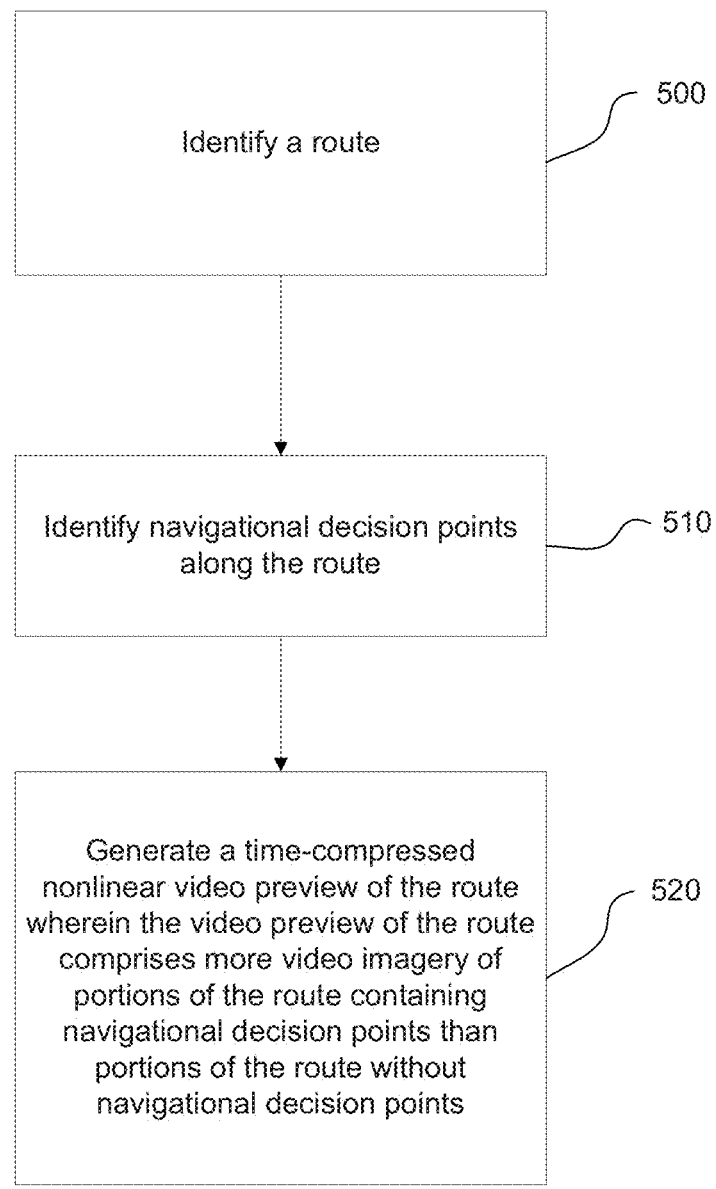
FIG. 9 is a flowchart depicting a method of generating a time-compressed nonlinear video preview of the route.
Figure 10:
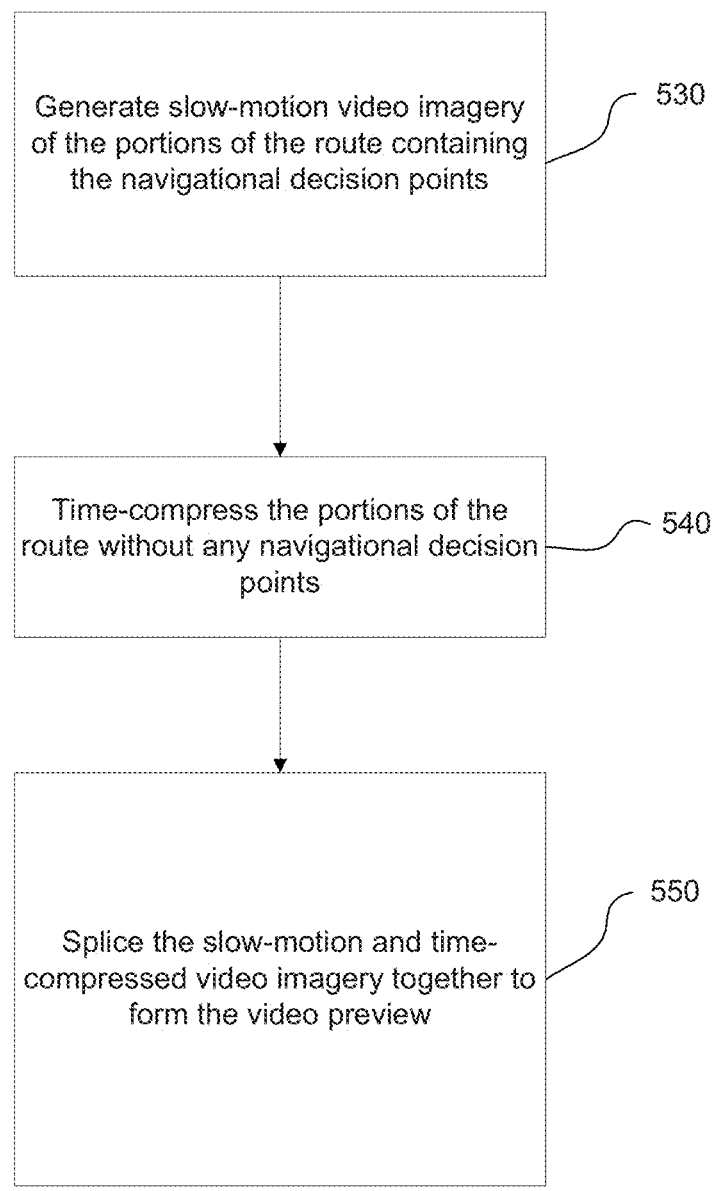
FIG. 10 is another flowchart depicting a method of generating the video preview by splicing together slow-motion video and time-compressed video.

To recap, the method or process of generating the preview video may entail, as shown in FIG. 9, a step 500 of identifying the route, a step 510 of identifying navigational decision points along the route, and a step 520 of generating a time-compressed nonlinear video preview of the route. The video preview of the route comprises more video imagery of portions of the route containing navigational decision points than portions of the route without navigational decision points. More video imagery means that there may be more video frames, a longer play time and/or higher resolution video frames. The method may, in one particular implementation depicted in the flowchart of FIG. 10, entail a step 530 of generating slow-motion video imagery of the portions of the route containing the navigational decision points, a step 540 time-compressing the portions of the route without any navigational decision points and a step 550 of splicing the slow-motion and time-compressed video imagery together to form the video preview. The video may be downloaded to the device or streamed back to the device.

The preview-generating device 200 may optionally add audible narration to the video to explain verbally what the user is seeing in the preview. The device 200 thus generates audible commentary to accompany the video (i.e. to be incorporated into the video as an audio sound track). The route-previewing device 100 may play the audible commentary with (or as part of) the video. For example, at a navigational decision point, the video may provide narration (spoken instructions) such as "You will then turn right on Main Street. Be careful to get into the rightmost turning lane."

Figure 11:
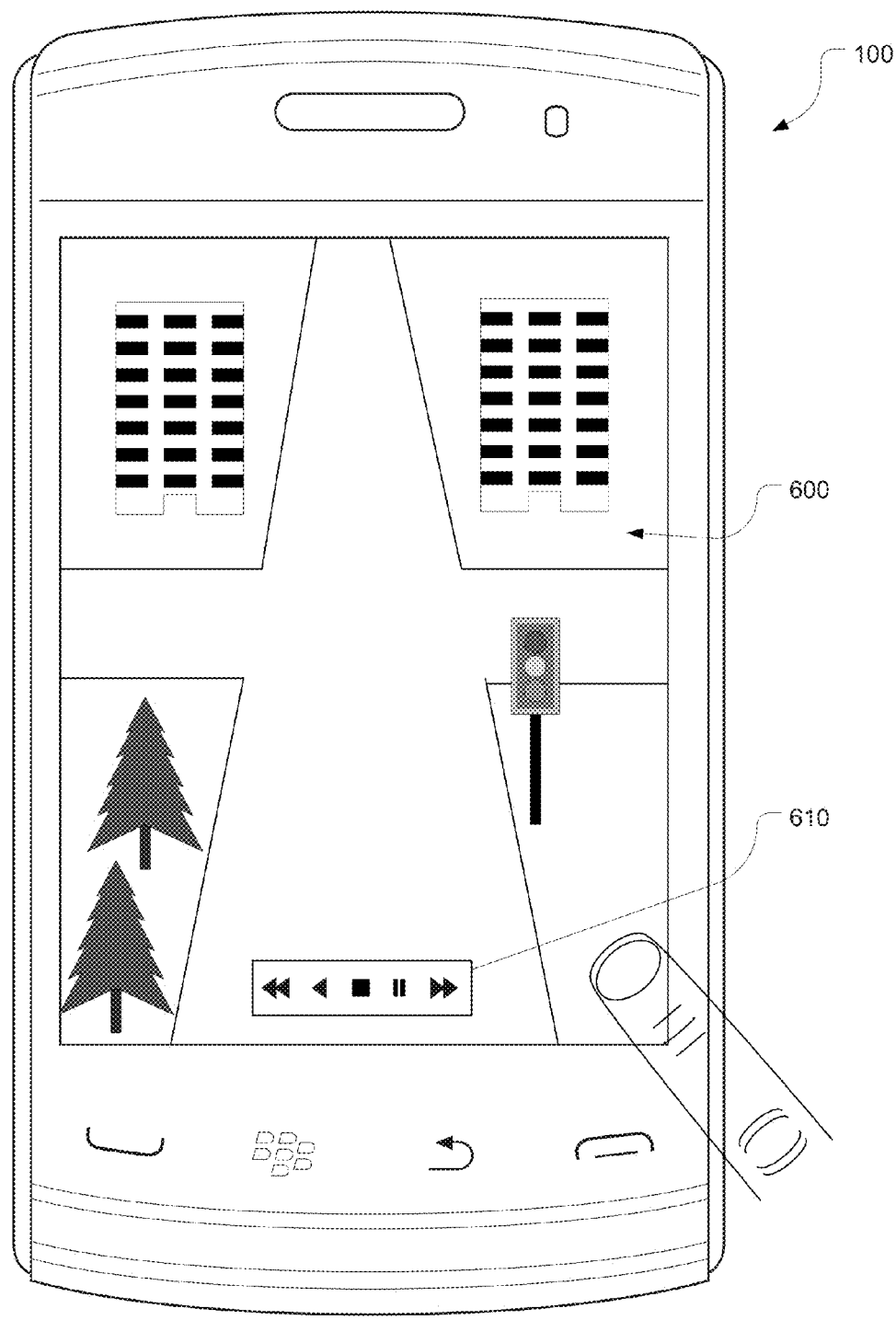
FIG. 11 is a mobile device displaying the video preview.

The device may play the video preview in response to user input (e.g. a play video command) or the device may be programmed to automatically play the video preview as a prelude to navigating a route. FIG. 11 shows an example of a frame of a video preview 600 showing the route to be navigated. The device may also display a video control bar 610 may be displayed with functions such as pause, stop, fast-forward, rewind, etc. In another embodiment, the video preview, or any part or segment thereof, may be played during the navigation. For example, if a user is stationary at a traffic light, service station, rest stop, or parking spot, the user may request that the device provide a preview of the next section of the route. This request may be via manual input, touch input, or voice command such as "Show next preview" or "Show me the next section of the route". The device would then display the portion of the video from the current location to the next decision point or beyond. In one embodiment, the device only displays the preview if the device is stationary. The preview may thus be stopped if the car starts to move. In other embodiment, the preview may be activated even if the navigation application is not providing navigation instructions or if the navigation application is not executing on the device. If the user was just driving normally and stopped at a traffic light or other location, the user could request a preview of the area beyond the intersection or around a corner. This may be done by voice command such as "What's left?" or "What's right?" or "What's down the street?" The device would play a short preview of what is around the corner or down the street. This could be implemented with a fast processor or by caching a preview for an upcoming decision point.

Figure 12:
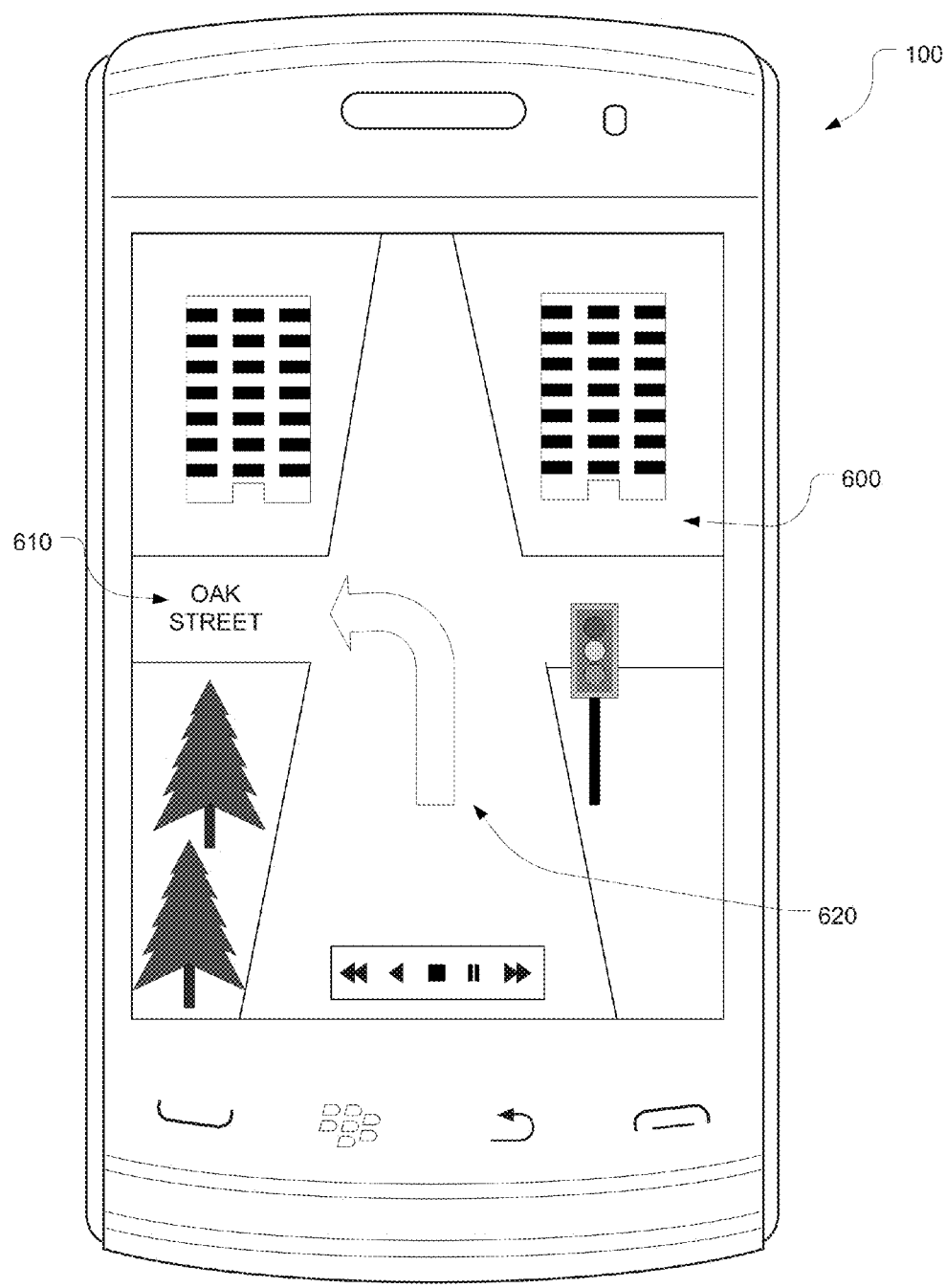
FIG. 12 is a mobile device displaying arrows and labels superimposed on the video preview.

Optionally, as shown by way of example in FIG. 12, the video imagery of the preview 600 may be superimposed with labels 620 (street names, addresses, POI names, landmark names, commercial entity names, etc.) and/or arrows 630 (showing how to navigate the decision point, e.g. where exactly to turn).

Figure 13:
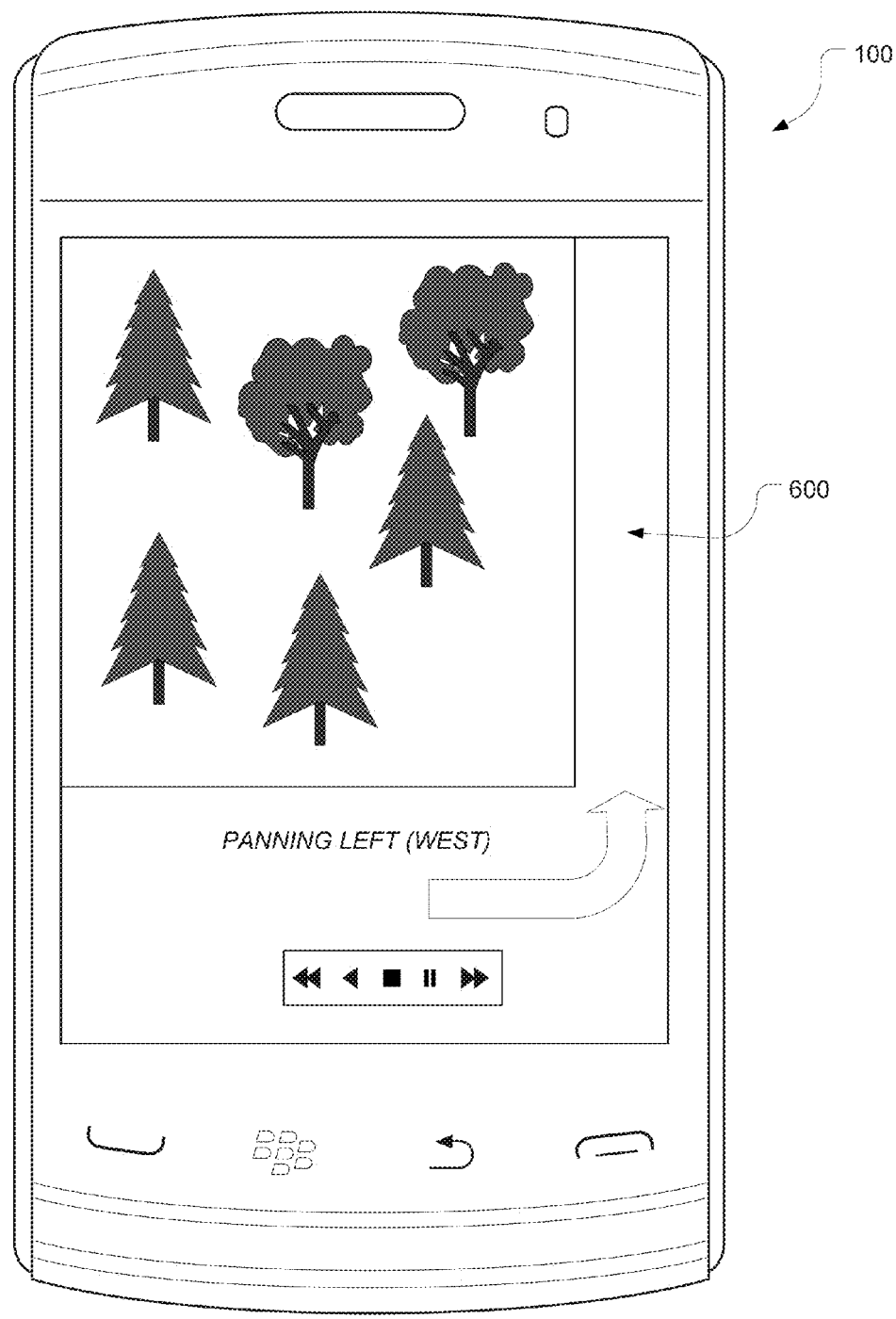
FIG. 13 is a mobile device displaying panning of the video preview at a navigational decision point.

In one embodiment, the slow-motion video imagery may include collateral imagery visible by panning side to side at navigational decision points. In other words, at a navigational decision point such as an intersection, the video may slow down, pan left, then pan right (or vice versa), and then continue to advance slowly through the intersection. By panning left and right, the user is given a more complete view of the surroundings at the navigationally critical intersection. FIG. 13 shows an example of a view of a forested area to the left of the route that becomes visible when panning to the left.

In another one embodiment, displaying the slow-motion video at a navigational decision point may include providing both real-speed video imagery followed by a slow-motion replay of the same decision point. In other words, the video preview may present an intersection, turnoff or other decision point at a speed that represents the real-world speed at which a vehicle would travel through the decision point or it may present this decision point at an accelerated speed. The same intersection or decision point may then be replayed in slow motion.

From the foregoing, it is apparent that this technology enables a short preview video to be generated and presented to a user intending to navigate a route. To recap, the method generates a short preview video of the trip so that the user can preview the route before actually driving the route. This permits the user to note important landmarks, turns and intersections that the user will encounter along the route. The method may compress simple portions of the trip (e.g. uncomplicated highway sections) and elongate complex or noteworthy sections (e.g. intersections, turns, lane mergers or notable landmarks or points of interest).

For example, if the user wanted to drive from Waterloo, Ontario to a location downtown Toronto, Ontario, the user would enter a starting address and a destination address into the application on the device (or, alternatively, use the current location as the starting address). The device would transmit this data to the server which would then compile a video preview from street-level imagery. The device would playback the video preview (with optional audible instructions) showing how to get on the highway in, for example, 10 seconds. The preview then would for example devote another 10 seconds to show the simple highway section between the two cities, perhaps pausing or slowing along the way to emphasize or highlight sections where the user needs to be in a certain lane. The video preview would then, for example, slow down to show how to transfer onto the correct lane for getting on the expressway into Toronto. The video preview would then, for example, devote a full 10 seconds to show the approach to the off ramp, taking time to pan the camera left and right to show the surroundings. The remainder of the video would for example show the various intersections in downtown Toronto leading to the destination with the video slowing and panning at each required turn to familiarize the user with each turn while moving at time-compressed ("fast-forward") speed though intersections where there is no turn to be made. As noted earlier, this video may include audible instructions, arrows, textual labels, etc which may be overlaid on the video frames to provide further information to the user.

In a further implementation, the device could learn the user's familiarity with segments of the route. Thus, if the device detects that the user has frequently driven a certain segment of the route, that segment of the route may be categorized by the device as easy or simple, permitting a greater compression of that segment than would ordinarily be done for a typical user. The degree of compression and/or nonlinearity may be automatically adjusted based on the user's location, language or other such factors. For example, the device may consider whether the route in within the user's home country or within a foreign country, whether the device language (user's language) is different from the local language (the local road signs). The device may also consider other such factors that may suggest some familiarity with the local roadway, local language and local traffic signage system.

In a further implementation, the video preview could obtain daytime or night-time imagery, seasonal imagery (winter imagery, summer imagery, etc.), or weather-specific imagery (sunny, rainy, cloudy, snowing, etc.) from the imagery server. Imagery that shows the street view as it would appear for a given time of day or night, a given season and for given weather conditions can enhance the navigational experience for the user by showing what would actually be visible along the route.

In a further implementation, the video preview could present two or more alternate routes to the destination or any detours that may be encountered along the route. Detours may be automatically suggested in response to the receipt of real-time traffic data, road construction reports, accident reports, weather alerts, etc).

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented method for providing navigation information, the method comprising:
   identifying a route;
   identifying navigational decision points along the route;
   defining segments of the route;
   assigning a navigational complexity score to each segment of the route; and
   generating a nonlinear video preview of the route by time-compressing at least some of the segments based on the score for each segment of the route wherein the video preview of the route comprises more video imagery of portions of the route containing navigational decision points than portions of the route without navigational decision points, the generating including generating slow-motion video imagery of a portion of the route containing a navigational decision point, the slow-motion video imagery having a slower play speed than real-world-speed video and comprising panning side to side at a navigational decision point to provide street-level side view imagery of the navigational decision point.

2. The method as claimed in claim 1 wherein generating the video preview with more video imagery of the portions of the route containing navigational decision points comprises providing one or more of (i) more video frames; (ii) a longer play time and (iii) higher resolution video frames.

3. The method as claimed in claim 1 wherein generating the video preview comprises:
   time-compressing the portions of the route without any navigational decision points; and
   splicing the slow-motion and time-compressed video imagery together to form at least part of the video preview.

4. The method as claimed in claim 1 further comprising:
   generating audible commentary to accompany the video; and
   playing the audible commentary with the video.

5. The method as claimed in claim 1 wherein generating the slow-motion video imagery comprises providing, at all navigational decision points, both real-speed video imagery followed by a slow-motion replay.

6. The method as claimed in claim 1 further comprising superimposing one or both of labels and arrows on the video imagery.

7. A non-transitory computer-readable medium comprising instructions in code which when loaded into a memory and executed by a processor of a computing device cause the computing device to:
   identify a route;
   identify navigational decision points along the route;
   define segments of the route;
   assign a navigational complexity score to each segment of the route; and
   generate a nonlinear video preview of the route by time-compressing at least some of the segments based on the score for each segment of the route wherein the video preview of the route comprises more video imagery of portions of the route containing navigational decision points than portions of the route without navigational decision points, the generating including generating slow-motion video imagery of a portion of the route containing a navigational decision point, the slow-motion video imagery having a slower play speed than real-world-speed video and comprising panning side to side at a navigational decision point to provide street-level side view imagery of the navigational decision point.

8. The computer-readable medium as claimed in claim 7 wherein the code for generating the video preview with more video imagery of the portions of the route containing navigational decision points comprises code for providing one or more of (i) more video frames; (ii) a longer play time and (iii) higher resolution video frames.

9. The computer-readable medium as claimed in claim 7 wherein the code that causes the device to generate the video preview comprises code that causes the device to:
   time-compress the portions of the route without any navigational decision points; and
   splice the slow-motion and time-compressed video imagery together to form at least part of the video preview.

10. The computer-readable medium as claimed in claim 7 further comprising code that causes the device to:
    generate audible commentary to accompany the video; and
    play the audible commentary with the video.

11. The computer-readable medium as claimed in claim 7 wherein the code that generates the slow-motion video imagery comprises code for providing, at all navigational decision points, both real-speed video imagery followed by a slow-motion replay.

12. The computer-readable medium as claimed in claim 7 further comprising code for superimposing one or both of labels and arrows on the video imagery.

13. A computing device comprising:
    a user input device for receiving a starting point and a destination that defines a route;
    a data transceiver for transmitting the route to a preview-generating server that generates a video preview of the route; and
    a processor operatively coupled to the memory for cooperating with the data transceiver to receive the video preview of the route, the video preview comprising nonlinear video having more video imagery of portions of the route containing navigational decision points than portions of the route without navigational decision points, the video preview further comprising slow-motion video imagery of a portion of the route containing a navigational decision point, the slow-motion video imagery having a slower play speed than real-world-speed video and comprising panning side to side at a navigational decision point to provide street-level side view imagery of the navigational decision point, the processor being further configured to cooperate with a display to play the video preview of the route.

14. The computing device as claimed in claim 13 wherein the video preview of the portions of the route containing the navigational decision points comprises one or more of (i) more video frames; (ii) a longer play time and (iii) higher resolution video frames than the portions of the route without the navigational decision points.

15. The computing device as claimed in claim 13 wherein the processor is configured to:
    time-compress the portions of the route without any navigational decision points; and
    splice the slow-motion and time-compressed video imagery together to form at least part of the video preview.

16. The computing device as claimed in claim 13 wherein the processor is further configured to:
    generate audible commentary to accompany the video; and
    play the audible commentary with the video.

17. A system comprising:
    a route-previewing device for receiving input defining a starting point and a destination point and for identifying a route based on the starting point and the destination point;
    a preview-generating device for receiving the route from the route-previewing device and for generating an image request for the route; and
    a street-level imagery server for receiving the image request from the preview-generating device and for communicating imagery of the route to the preview-generating device in response to the image request, wherein the preview-generating device generates a nonlinear route preview from the imagery of the route, the generating including defining segments of the route, assigning a navigational complexity score to each segment of the route, time-compressing at least some of the segments based on the score for each segment of the route, and generating slow-motion video imagery of a portion of the route containing a navigational decision point where the slow-motion video imagery has a slower play speed than real-world-speed video and comprises panning side to side at a navigational decision point to provide street-level side view imagery of the navigational decision point, and wherein the preview-generating device communicates the preview to the route-previewing device, and wherein the route-previewing device displays the preview.

18. The system as claimed in claim 17 wherein the video preview of portions of the route containing navigational decision points comprises one or more of (i) more video frames; (ii) a longer play time and (iii) higher resolution video frames than portions of the route without navigational decision points.

19. The system as claimed in claim 17 wherein the preview-generating device is configured to:
 time-compress the portions of the route without any navigational decision points; and
 splice the slow-motion and time-compressed video imagery together to form at least part of the video preview.

* * * * *